United States Patent [19]

Hughes et al.

[11] Patent Number: 4,642,480

[45] Date of Patent: Feb. 10, 1987

[54] LOW PROFILE CABLE WITH HIGH PERFORMANCE CHARACTERISTICS

[75] Inventors: Richard L. Hughes, Clemmons; Anthony W. Turney, Walnut Cove, both of N.C.; Raymond J. Look, Largo, Fla.

[73] Assignee: AMP Incorporated, Harrisburg, Pa.

[21] Appl. No.: 716,417

[22] Filed: Mar. 27, 1985

[51] Int. Cl.[4] .......................... H01B 7/08; H02G 3/18

[52] U.S. Cl. ...................................... 307/147; 174/36; 174/70 C; 174/72 C; 174/117 F

[58] Field of Search ..................... 174/36, 70 C, 72 C, 174/117 F, 117 FF, 48; 333/1; 307/147; 361/332, 428

[56] References Cited

U.S. PATENT DOCUMENTS

| | | | |
|---|---|---|---|
| 2,581,472 | 1/1952 | Dudley et al. | 174/117 F |
| 2,963,676 | 12/1960 | Sneesby et al. | 174/70 C |
| 3,309,458 | 3/1967 | Yoshimura et al. | 174/110 F |
| 3,567,846 | 3/1971 | Brorein et al. | 174/36 X |
| 3,715,627 | 2/1973 | D'Ausilio | 307/147 X |
| 3,727,168 | 4/1973 | Henschen et al. | 361/428 X |
| 3,735,022 | 5/1973 | Estep | 174/117 F |
| 3,757,029 | 9/1973 | Marshall | 174/36 |
| 3,763,306 | 10/1973 | Marshall | 174/115 |
| 3,775,552 | 11/1973 | Schumacher | 174/105 R |
| 3,809,966 | 5/1974 | Tirrell et al. | 361/332 |
| 4,030,801 | 6/1977 | Bunnell | 174/48 X |
| 4,155,613 | 5/1979 | Brandeau | 339/29 R |
| 4,213,013 | 7/1980 | Perna et al. | 361/428 X |
| 4,218,581 | 8/1980 | Suzuki | 174/117 F |
| 4,220,807 | 9/1980 | Anastasi et al. | 174/117 F X |
| 4,287,385 | 9/1981 | Dombrowsky | 174/36 |
| 4,387,949 | 6/1983 | Haitmanek | 174/48 X |
| 4,404,424 | 9/1983 | King et al. | 174/36 X |
| 4,419,538 | 12/1983 | Hansell, III | 174/117 F |
| 4,443,657 | 4/1984 | Hill et al. | 174/117 F X |
| 4,449,778 | 5/1984 | Lane | 339/143 R |
| 4,468,089 | 8/1984 | Brorein | 174/117 F X |
| 4,481,379 | 11/1984 | Bolick, Jr. et al. | 174/36 |
| 4,487,992 | 12/1984 | Tomita | 174/36 |
| 4,488,125 | 12/1984 | Gentry et al. | 174/115 X |

FOREIGN PATENT DOCUMENTS

| | | | |
|---|---|---|---|
| 41097 | 12/1981 | European Pat. Off. | 174/117 F |
| 1465818 | 4/1969 | Fed. Rep. of Germany | 174/117 A |
| 1304739 | 8/1962 | France | 174/70 C |
| 1471248 | 3/1967 | France | 174/117 A |
| 17112 | 4/1967 | Japan | 174/48 |

OTHER PUBLICATIONS

AMP Instruction Sheets IS 3132 released 10/1/83; IS 3143 released 6/1/84 and IS 3138 released 11/15/83.

*Primary Examiner*—Arthur T. Grimley
*Assistant Examiner*—Morris H. Nimmo
*Attorney, Agent, or Firm*—Robert W. Pitts

[57] ABSTRACT

A low profile cable capable of undercarpet transmission of electrical signals is disclosed. The body of the cable includes an essentially flat central region and tapered wings extending outwardly from the central region. It is fabricated of a flexible polymer for positioning around curves. The wings may include cut out sections and opposing slits to facilitate bending of the cable around such curves. The transverse section of the body is symmetric about both its central vertical axis and its central horizontal axis.

10 Claims, 12 Drawing Figures

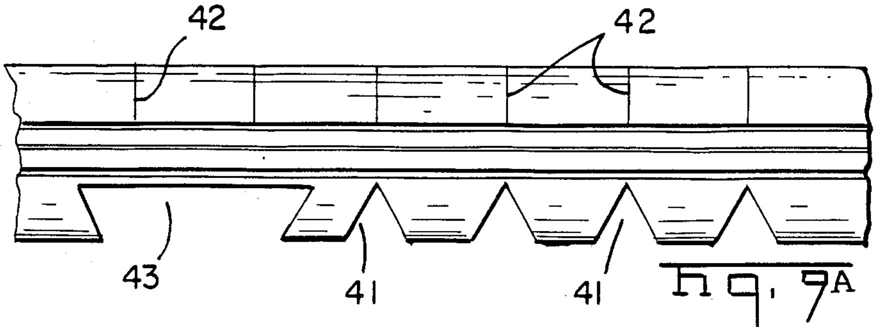
Fig. 9A
Fig. 9
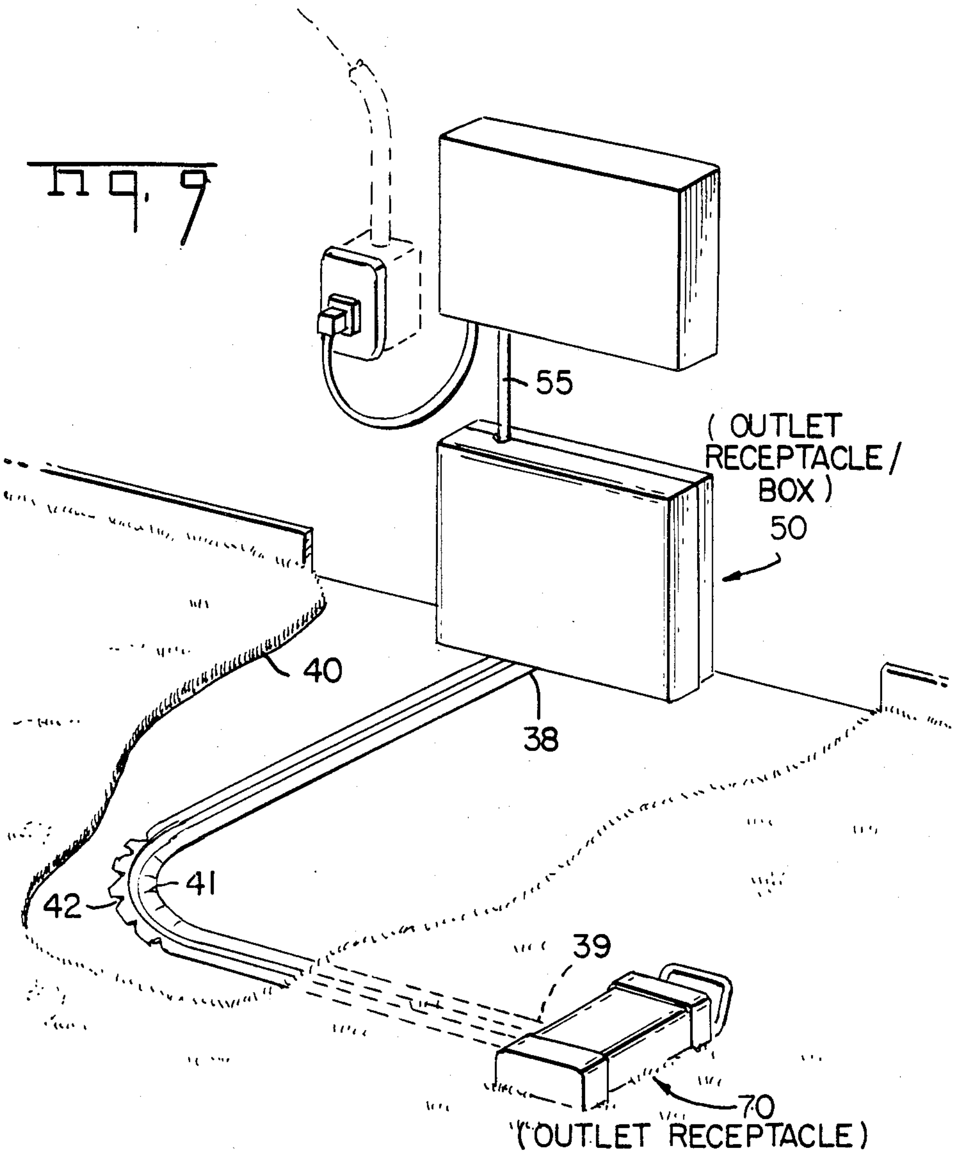

LOW PROFILE CABLE WITH HIGH PERFORMANCE CHARACTERISTICS

BACKGROUND OF THE INVENTION

1. Field of the Invention

This invention relates to a low profile cable capable of the undercarpet transmission of electrical signals, fabricated of a flexible polymer for positioning around curves, and with an essentially flat central region and tapered wings extending outwardly therefrom.

2. Description of the Prior Art

Conventional multiconductor cables for transmitting high frequency electrical signals include both shielded twisted pair cables and coaxial cables. Such cables have their greatest utility in transmitting electrical signals between components. Such transmitted signals may be in digital form or in analog form.

Shielded twisted pair cables utilize a pair of insulated conductive wires in a twisted pair configuration with a grounded, electrically conductive shield around each twisted wire pair. The shield functions to reduce electromagnetic interference radiation, generally called EMI, which naturally emanates from signal transmitting wires and which might otherwise adversely affect the performance of adjacent electronic devices. Such shield also functions to minimize cross talk, electrical interference between one pair of wires and an adjacent pair which would tend to impair the fidelity of the signals being transmitted. Shielded twisted pair cables can constitute a type of a differential transmission system where both wires are electrically powered and both constitute signal carrying wires. The information transmitted is a function of the sequential voltage differential between the two wires of the pair. An example of a shielded twisted pair cable is described in U.S. Pat. No. 4,404,424 issued to King et al.

In a manner similar to shielded twisted pair cables, coaxial cables use an EMI shield to reduce radiation. But in coaxial cables, unlike shielded twisted pair cables, only one electrically powered signal wire is utilized. The signal wire is encased in insulation which is surrounded, in turn, by the grounded, electrically conductive shield. In coaxial cables, the shield also functions as a grounded reference for the voltage of the signal wire. An example of a coaxial cable is described in U.S. Pat. No. 3,775,552 issued to Schumacher.

Considerable effort has been expended to develop a flat coaxial cable which would yield the same performance characteristics as conventional coaxial cable but which would also enable the use of conventional mass stripping and termination techniques to thus facilitate the coupling of an electrical connector to the cable. Consider for example U.S. Pat. No. 4,488,125 to Gentry et al.

Other flat coaxial cables are disclosed in U.S. Pat. Nos. 4,487,992 and 3,775,552.

One application for flat cable is in under the carpet wiring situations in which a flat, low profile cable is extended beneath a carpet for connection to, and coupling of, components of an electrical system such as a computer system or the like. Shielded twisted pair cables do not have a low profile suited for use in undercarpet applications since twisted wires are continuously and sequentially located above, to one side, below, and to the other side of each other along the length of the cable. As a result, the cable thickness periodically increases to a double wire thickness along the length of the cable. This arrangement of signal wires thus precludes low profile cable configurations since low profile cable configurations are possible only in cables having their wires spaced parallel to each other in a single, usually horizontal, plane. The configuration and orientation of wires in a shielded twisted pair cable also precludes mass stripping and termination since the positioning of any one wire with respect to another varies as a function of where the cable is cut along its length.

While many types of cables have been proposed in the past, the invention disclosed herein contemplates a low profile, flat cable having the performance characteristics of shielded twisted pair cable but yet having a low profile suited for undercarpet installations. The flat cable disclosed herein also has the mass stripping and termination capabilities of other flat cable since its signal wires are consistently spaced with respect to each other and with respect to precise cable locations, unlike conventional shielded twisted pair cable. It is fabricated of a flexible elastomer with an essentially flat central region and tapered wings extending outwardly therefrom for positioning around curves.

SUMMARY OF THE INVENTION

The preferred embodiments of the electrical distribution system of the instant invention comprise a low profile cable capable of undercarpet transmission of electrical signals equivalent of a shielded twisted pair cable. A flat body surrounds at least one pair of electrically powered signal carrying wires located in a common plane and spaced from each other along their lengths. The body is formed with a longitudinal central region and longitudinal wings secured to the opposite edges of the central region with the wings being tapered having their greatest thickness at their edges adjacent said central region. The faces of the central region are flat and parallel with each other while a minor extent of the wings are also flat and parallel. The transverse profile of the body is symmetric about both its central horizontal plane and about its central vertical plane. A wing may be provided with at least one pie-shaped or rhombus-shaped cutout section with a transverse slit on its wing opposing the cutout section to facilitate the bending of the cable around curves. These cutouts can be made in the field. The cable is especially suited for use in the undercarpet coupling of spaced electronic components or the connection of an electronic component to a junction. In the first installation, the first end of the cable is positioned for coupling with a first electronic component and the second end of the cable is positioned for coupling with a second electronic component, and with that portion of said cable between said first and second ends being located beneath a carpet. In the second the first end is merely connected between a wall box and a floor fitting with the flat conductor portion looped within the wall box and floor fitting and attached to a connector adaptor mounted therein. In the preferred embodiment of the invention, a wall-mounted outlet receptacle box has a bulkhead therein having a connector adapter for obliquely mounting the connector with the cable looped on one side of the bulkhead. A floor fitting outlet receptacle also contains a connector adapter opening for mounting the connector with the cable looped perpendicular to the cable on the floor.

BRIEF DESCRIPTION OF THE DRAWINGS

FIG. 9 is a perspective showing of electrical components in an office environment coupled with the cable of FIG. 1 while FIG. 9A illustrates cuts in the cable prior to bending.

DESCRIPTION OF THE PREFERRED EMBODIMENT

Figure 1:
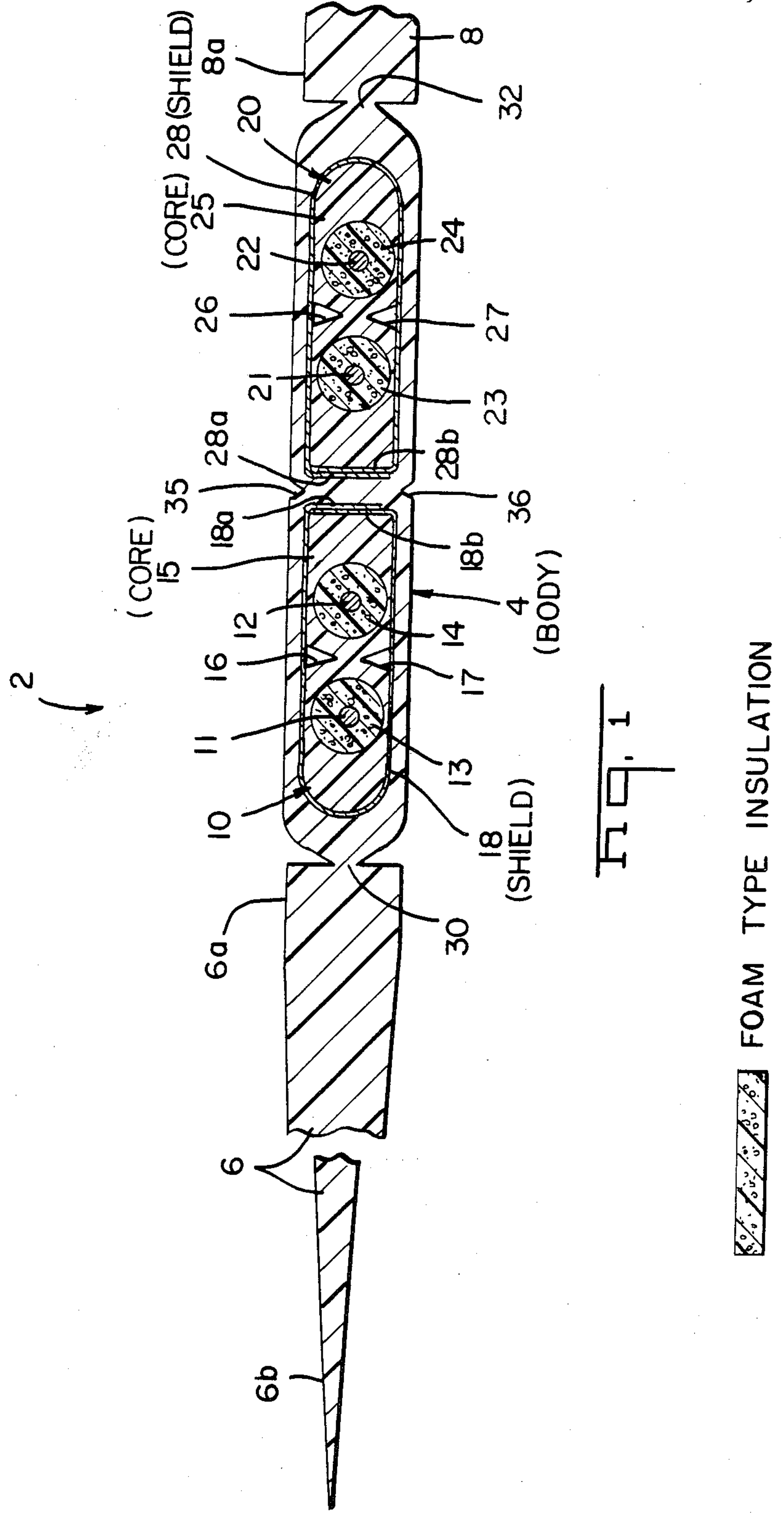
FIG. 1 is a cross-sectional view of a flat cable with two pair of wire conductors especially adapted for use in undercarpet installations.

The multilayer shielded pair cable comprising the preferred embodiment of this invention provides a controlled, high impedance, low cross talk, low attenuation multiconductor flat cable suitable for use in transmitting digital or other high frequency signals. The preferred embodiment will be described in terms of a flat conductor cable having two separate pairs of associated wire conductors, four conductors in all. It should be understood, however, that some applications may require cable having more than two pairs of conductors. This invention is consistent with the use of any number of pairs of conductors and can be employed with a single pair of conductors or with a large number of pairs. Indeed, this invention is intended for use in applications requiring three pairs of conductors in a manner similar to the use of the two-pair cable which comprises the preferred embodiment of this invention.

The preferred embodiment of this invention as depicted herein is intended for use in installations in which the flat cable is to be installed along the floor of an office building and under the carpet to enable connections to be made with portions of a network arbitrarily distributed in an office building. It should be understood, however, that this high performance cable, having conductors located within the same plane, is not limited to use in undercarpet installations. Indeed, the constant orientation of the conductors in the same plane, and at predetermined locations within the cable, renders this cable quite suitable to applications in which it is desirable that the conductors be simultaneously mass terminated to connectors positioned at the end of the cable. This cable is also quite suitable for use as a preterminated cable assembly in which connectors may be assembled at each end of precise lengths of cable in a factory environment.

As illustrated in FIG. 9, a typical utilization of the present cable is in the coupling of electrical components in an office environment. Such application might include an adaptor and connector at one end, a first end 38, of the cable coupling to a wall box 50 or other in-wall component and with the other end, or second end 39, of the cable terminating in a floor fitting 70 for coupling to a terminal, printer, facsimile device or the like on a desk or work station. The cable between its ends lies beneath carpet 40.

As can be seen in the drawings, particularly with reference to FIG. 1, the cable itself is fabricated with a common symmetrical cross-sectional profile along its entire length. By virtue of its weakened sections 30 and 32 and inherent flexibility it can rest on the floor in a flat condition no matter which side is placed on the floor. Note the flattened wings resting on the floor as shown in FIG. 9. With reference again to FIG. 9, both ends of the cable may be stripped for coupling the cable with an adaptor and connector of the type as disclosed in U.S. patent application Ser. No. 716,779, filed Mar. 27, 1985, entitled ADAPTOR FOR COUPLING A CABLE TO A CONNECTOR, filed concurrently herewith and assigned to the same assignee as the present application. The subject matter of that application is incorporated by reference herein.

The cross-sectional configuration shown in FIG. 1 demonstrates the relative positioning of four wire conductors 11, 12, 21 and 22 in a flat cable assembly 2. Each of the conductors 11, 12, 21 and 22 employed in the preferred embodiment of this invention comprises a conventional round wire conductor. Conductors 11 and 12 comprise one associated pair of conductors while conductors 21 and 22 comprise a similar pair of associated conductors. Although each of the conductors 11, 12, 21 and 22 is positioned in the same plane, thus facilitating the low profile necessary for use in undercarpet installations, the two conductor pairs are nevertheless electrically balanced. Both of the conductor pairs are embedded in an outer insulating body 4 which comprises the central longitudinally extending portion or region of the cable 2. Similarly-shaped wings or ramps 6 and 8 are bonded longitudinally along the opposite sides of the central body 4. Each of the wings 6 and 8 comprises an inclined surface to provide a smooth transition laterally of the axis of the cable, thus eliminating any sharp bump when the cable is positioned beneath a carpet. In the preferred embodiment of this invention, the insulating ramps 6 and 8 are formed from the same material as the insulating material which forms insulating body 4. Wings 6 and 8 are joined to body 4 along weakened longitudinally extending sections 30 and 32. In the preferred embodiment of this invention, the insulating material forming the body 4 and the insulating material forming wings 6 and 8 comprises an extruded insulating material having generally the same composition. A conventional polymer such as polyvinyl chloride, PVC, insulation comprises one material suitable for use in the jacket or body 4 in the wings 6 and 8.

The surfaces or faces of the opposed central regions of the cable are parallel to each other. A continuation of such parallelism extends to a limited degree into the wings of the cable. This extending of the parallelism into the wings provides for an extended thicker, horizontal section of the cable between the tapered regions of the wings when the cable is placed on the floor beneath a carpet. This design has been found to further distribute the forces from the carpet through the cable to the floor uniformly and reduce the external forces which would otherwise detrimentally act upon the wires and shield within the cable. As can be seen in FIG. 1, the transverse profile of the cable is low, and it is symmetric about both its central horizontal plane and its central vertical plane so that it may be employed with either face up reducing the chance for operator error during installation.

The opposed faces of the central region of the body are essentially flat and are as thin as possible consistent with known fabrication techniques while allowing for the high electrical performance of the cable. In the preferred embodiments of the invention this greatest thickness does not exceed from about 70 mils. The width of the cable should be of such a dimension so that when employed under a carpet it will allow a smooth transition from the floor to the center of the cable and then thereacross. The presence of the cable should not be discernible. A preferred dimension for the width of the cable has been found to be about 2.000 inches. Such dimension will allow the above described smooth transition but will not enlarge the taper of the wings to the extent of being wasteful of material constituting their body.

Figure 2:
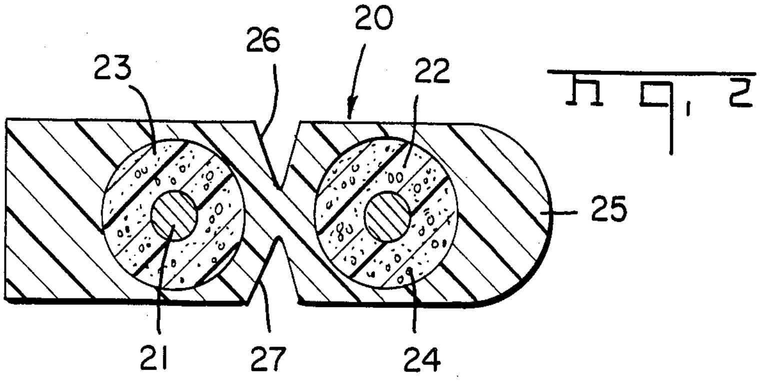
FIG. 2 is a cross-sectional view of a single wire pair cable embedded in an insulating core surrounding both conductors of an associated pair.

Each shielded cable pair is separately embedded within the insulating body 4. As shown in FIG. 2, the conductors 21 and 22 forming one pair 20 of associated conductors are surrounded or embedded within a separate insulating core 25 which is, in turn, embedded within the body 4 of cable 2. Each conductor 21 and 22 is, however, surrounded by a first insulation 23 and 24 respectively which comprises a foam-type insulation having a relatively low dielectric constant. A polymeric, foamable insulation such as polypropylene or polyethylene, or any like material which can be fabricated with a large percentage of air trapped within the material, comprises a suitable dielectric material for use around the conductors in areas of relatively high dielectric field.

In accordance with the preferred embodiment of the invention, the cylindrical insulation 23 and 24 for the conductors is extruded around the conductors. The extrusion material is preferably polyethylene resin with a predetermined percentage of a foaming agent blended with the polyethylene to be heated and extruded. It is the foaming agent which forms the air within the extruded product when subjected to heat and pressure. In accordance with known extrusion techniques, the materials, their compositions and proportions, the heat and speed of extrusion, the post-extrusion quenching, etc., are all carefully selected so as to form the insulation around the wire to exact dimensional tolerances and as a closed cell foam with about 40 to about 60 percent air by volume. It has been found that the maximum amount of air within the dielectric will improve the electrical performance of the system. However, excess air beyond the range as identified herein may degrade the dimensional stability and integrity of the foam.

Following the fabrication of the insulation surrounding the conductors, and prior to the performing of additional processing steps thereon, the individual insulating wires are preferable striped or otherwise marked with discrete, visually identifiable indicia 34 such as a color coding. Indicia, such as a helical color coded stripe along the length of the insulator on its exterior surface allows for visual differentiation of the various wires of the cable as during termination and coupling of the cable wires to an electrical component such as a connector. In this manner, when the final cable is stripped in association with a termination process, the proper wires of the cable may be coupled with the proper element of the connector or the like.

These foam covered conductors may then be embedded within an insulating material 25, as by extrusion, which completely surrounds the foam insulation 23 and 24 in the immediate vicinity of the conductors. The insulating material 25 need not have as low a dielectric constant as the foam insulation 23 and 24, since the insulating material 25 is located in areas of relatively lower electric fields. The insulating material 25 must, however, be suitable for imparting dimensional stability and integrity to conductors 21 and 22 as well as to their surrounding insulation 23 and 24. In fact, in this invention the dielectric material 25 holds the conductors 21 and 22 in a parallel configuration along precisely spaced surfaces, edges and center lines with respect to the cable and with respect to each other. The insulating material forming the core 25 also comprises a material having greater strength when subjected to compressive forces than the foam type insulation 23 and 24 surrounding conductors 21 and 22. A material suitable for forming core 25 is preferably a conventional flexible polyvinyl chloride, PVC, which can be extruded around the foam insulation 23 and 24 surrounding conductors 21 and 22. It is desirable that the foam type insulation 23 and 24 not adhere to the extruded insulating material forming the core 25 since the conductors must be removed from the core 25 for conventional termination into an adaptor and connector.

In the preferred embodiment of this invention, longitudinally extending notches 26 and 27 are defined along the upper and lower surfaces of the core 25. These notches, which can be conveniently formed as part of the extrusion process through the appropriate design of the die are located in areas of relatively low electric field and define a weakened section of insulating core 25 to permit separation of conductors 21 and 22 for termination purposes. Formed into the upper and lower surfaces of the body 4 are central notches 35 and 36 extending the length of the core along the centerline. These central notches are naturally formed during the cooling process following the extrusion since a greater quantity of shrinkable PVC is located in the body 4 between the upper and lower notches as compared with the quantity of PVC immediately to either side thereof.

Figure 3:
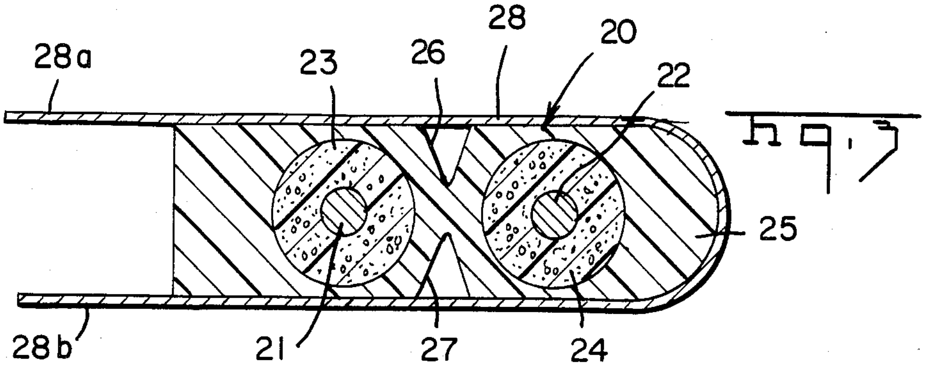
FIG. 3 is a cross-sectional view similar to FIG. 2 demonstrating the positioning of an EMI shield during fabrication of a shielded conductor pair.
Figure 4:
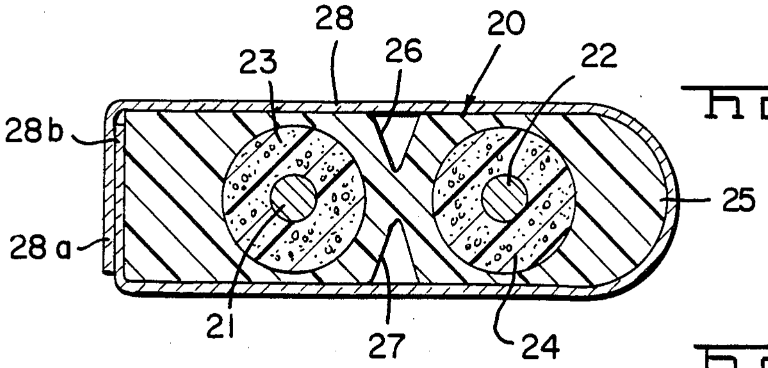
FIG. 4 is a view similar to FIG. 3 demonstrating the final position of the EMI shield encircling both conductors of the conductor pair.
Figure 5:
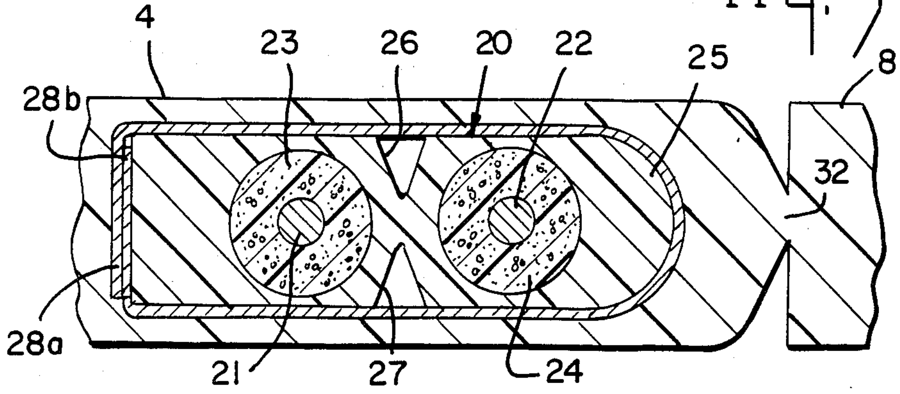
FIG. 5 is a cross-sectional view showing the single conductor pair surrounded by a EMI shield encircled by an outer insulating body.

The electrical performance of each pair of conductors is greatly enhanced by the use of EMI shields 18 and 28 encircling the cores 15 and 25 of the conductors within each conductor pair 10 and 20. As shown in FIG. 3, and EMI shield 28 can be positioned in partially encircling relationship to conductors 21 and 22 within insulating core 25. The ends 28A and 28B of EMI shield extend beyond the lateral edge of core 25 during fabrication of the cable. FIG. 4 shows that these ends 28A and 28B can then be folded into overlapping relationship along one end or edge of the core 25. In the preferred embodiment of this invention, the one edge of core 25 comprises a planar edge extending transversely of, and running along, the plane in which the conductors 21 and 22 are positioned. This planar edge facilitates assembly of the shield 28 in overlapping relationship along the edge of core 25. Furthermore, by providing sharp corners at the upper and lower extent of this planar surface, good contact is maintained between the overlapped portions 28A and 28B of the cable at these two points. Thus gaps, which can act as an antenna in the shielding are prevented. As shown in FIG. 5, the overlapped ends 28A and 28B of the EMI shield 28 are secured in a tightly held configuration by the insulating material extruded around the EMI shield and comprising the insulating body 4. Thus the ends 28A and 28B would not be subject to movement upon flexing of the cable to create a gap or radiating antenna. Positioning the overlapping edges of the shield 28 vertically on a flat edge of the core has been found to create a more secure and immovable relationship of shield edges than other positioning such as the locating of the edges of the shield on the top, bottom or curved side of the core 25. This preferred shield edge positioning has been found to maintain the integrity of the EMI shielding during the bending of the cable in undercarpet installations and under normal forces on the cable as experienced in an office environment.

In the preferred embodiment of this invention, an annealed metallic foil is employed as the EMI shields 18 and 28. For example, an annealed copper foil having about a 2 mil thickness is suitable for use as an EMI shield in these embodiments.

A flattened central portion extends across the central region of the cable and also includes a straight portion 6A and 8A constituting a minor extent of both wings. Tapered sections 6B and 8B are thus created by the wings across the majority of their lateral extents. When employed under a carpet, the deflection to the carpet is barely discernible to someone when walking thereacross or when rolling the wheels of a table or chair over the cable. It has also been found that the cable will not damaged nor will its performance be impaired by normal traffic of this type, even from the very high pressure of a heel of a woman's high heeled shoes. No problem would even arise if a filing cabinet or desk leg were to rest permanently upon the cable. It has been found that the PVC matrix of the cable yields slightly under heavy but normal office environmental loads. The cross sectional configuration of this material, however, tends to distribute any such downward compressive forces through the cable to the floor and around the signal wires and their insulation. Further details of the electrical operation and constructions of the cable of the instant invention can be found in U.S. patent application Ser. No. 707,935, entitled HIGH PERFORMANCE CABLE, filed on Mar. 4, 1985. The subject matter of that application is incorporated by reference herein.

Figure 8:
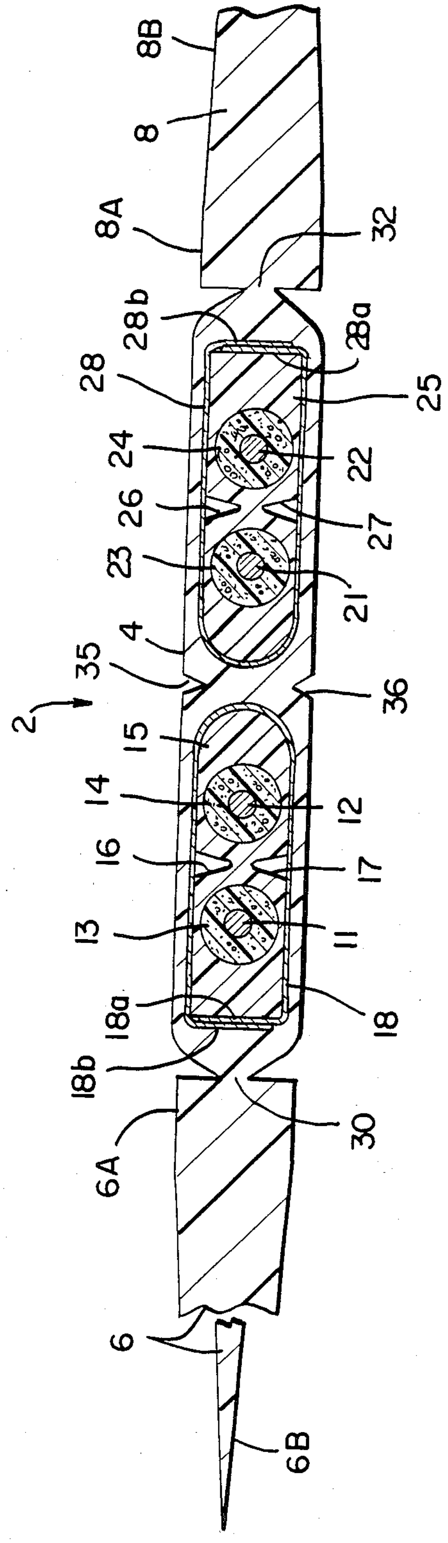
FIG. 8 is a view similar to FIG. 1 showing an alternate embodiment of a flat cable constructed in accordance with this invention.

FIG. 8 shows an alternate embodiment of this invention in which planar ends of the insulating cores, at which the EMI shield is overlapped are positioned on the exterior of the conductor pairs. FIG. 1 shows the two ends of the separate EMI shields positioned adjacent to each other within the body 4. Since the invention is suitable for use with more than two pairs of conductors, it is apparent that the relative positioning of the flat overlapping ends of the cable is a matter of choice. For example, if three pairs are employed, the flat ends of all three shields cannot be adjacent if all conductors are positioned within the same plane.

Because of its novel configuration, the cable can readily bend around corners, if needed, up to about a 12 inch radius curve. This situation might be necessitated where a partition, wall, beam or other object precludes the preferred straight line installation of the cable or even if it were to be arbitrarily decided to locate such cables only along walls. In such environment where a curving of the cable is necessary or merely desired, one or a plurality of pie-shaped segments 41 should be cut from the cable out of the wing of the inner radius to minimize the compressive forces which would otherwise accrue in such regions. Similarly, one or a plurality of transverse slits 42 should be made in the wing opposite the pie shape cut outs to thereby relieve tensile forces at such areas adjacent the outer radius of the cable. The number and size of pie-shaped segments and corresponding slits is a function of the extent of the curve in the cable and its radius of curvature. In an alternate embodiment of the curve, the segment removed from the wing may be shaped as a rhombus 43 with the shorter of its parallel sides formed from the edge of the cable and with the longer of its parallel sides formed from the weakened section 30 or 32 of the cable. A plurality of opposed transverse slits may be formed in the wing of the cable opposite the segment similar to the embodiment with the pie-shaped segments. It should be readily understood, however, that curves are preferably avoided since they require an extra length of cable and additional steps in its installation. Very slight curves with large radii of curvature can be accommodated without cutting the wings of the cable due to the natural and inherent flexibility of the cable.

Figure 6:
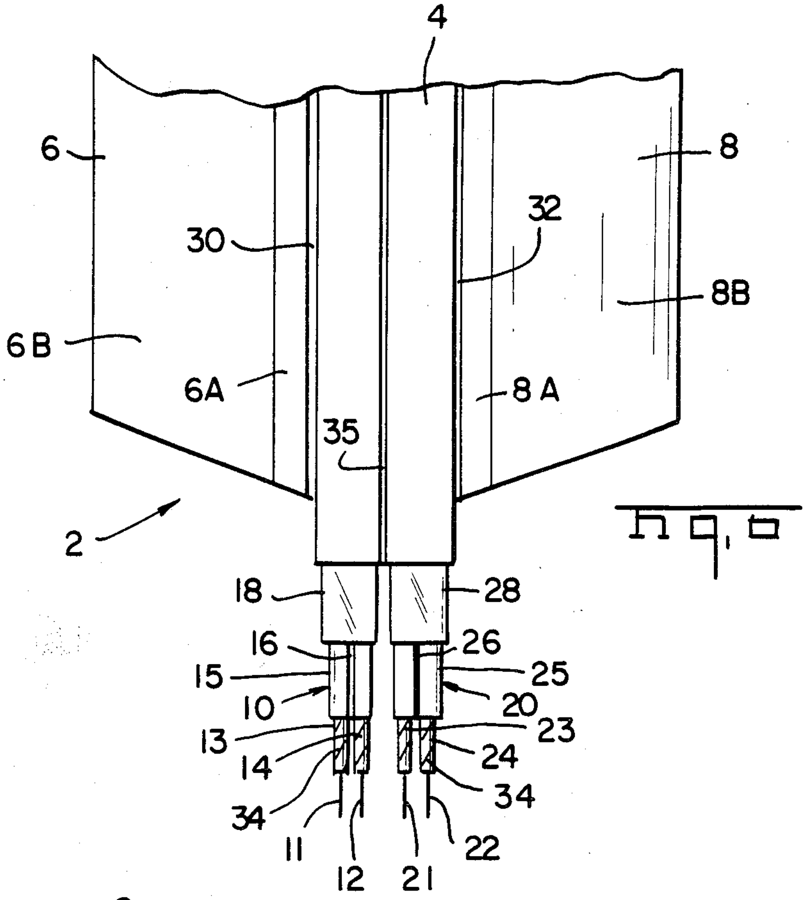
FIG. 6 is a plan view of a cable constructed in accordance with the preferred embodiment of this invention showing the removal of respective layers of insulation from the four conductors comprising two conductor pairs.
Figure 7:
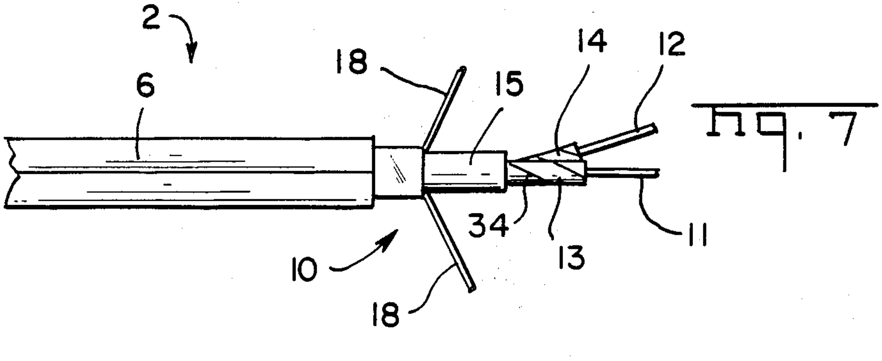
FIG. 7 is an elevational view of the cable as shown in FIG. 6 in which successive layers of the composite structure are shown adjacent one end of the cable.

Not only is this cable suitable for use in applications in which high electrical performance is required, this cable is also easily adaptable to termination of the separate conductors to an electrical connector at the end of the cable. FIGS. 6 and 7 illustrate the ease in which the conductors may be presented for termination. Initially the wings 6 and 8 can be removed adjacent the ends. Weakened sections 30 and 32 facilitate the preparation of the ends of the cable since the wings can be removed by simply tearing along the weakened sections 30 and 32. The insulating material comprising the insulated body 4 can then be removed from the shielded cable pairs. The use of annealed copper foil, to which the insulating material forming the body 4 does not adhere, permits the simple removal of this insulating material from the two conductor pairs. The shields 18 and 28 can then be cut and bent away from the extruded insulating core 15 and 25. The extruded insulating material forming core 25 can, in turn, be simply removed from the foam insulation surrounding conductors 21 and 22, since the foam insulation 23 and 24 does readily adhere to the extruded insulating material forming core 25.

At this point the conductors 21 and 22 within foam insulation 23 and 24 are suitable for solderless mass termination by conventional insulation displacement techniques. Both FIGS. 6 and 7, however, show the conductors 21 and 22 extending beyond the foam insulation 23 and 24. It should be appreciated that conductors 21 and 22 are shown primarily for illustrative purposes since it will normally not be necessary to remove insulation 23 and 24 from the bare conductors 21 and 22. However, it may be desirable in certain installations to remove the insulation 23 and 24 before terminating conductors 21 and 22 and this invention is suitable for use in this matter. Further details of preferred stripping methods and apparatus which may be utilized in association with the cable of the instant invention can be found in U.S. patent application Ser. No. 716,772, filed Mar. 27, 1985 entitled APPARATUS AND METHOD FOR STRIPPING HIGH PERFORMANCE FLAT CABLE filed concurrently herewith and assigned to the same assignee as the instant application. The subject matter of that application is incorporated by reference herein.

Figure 10:
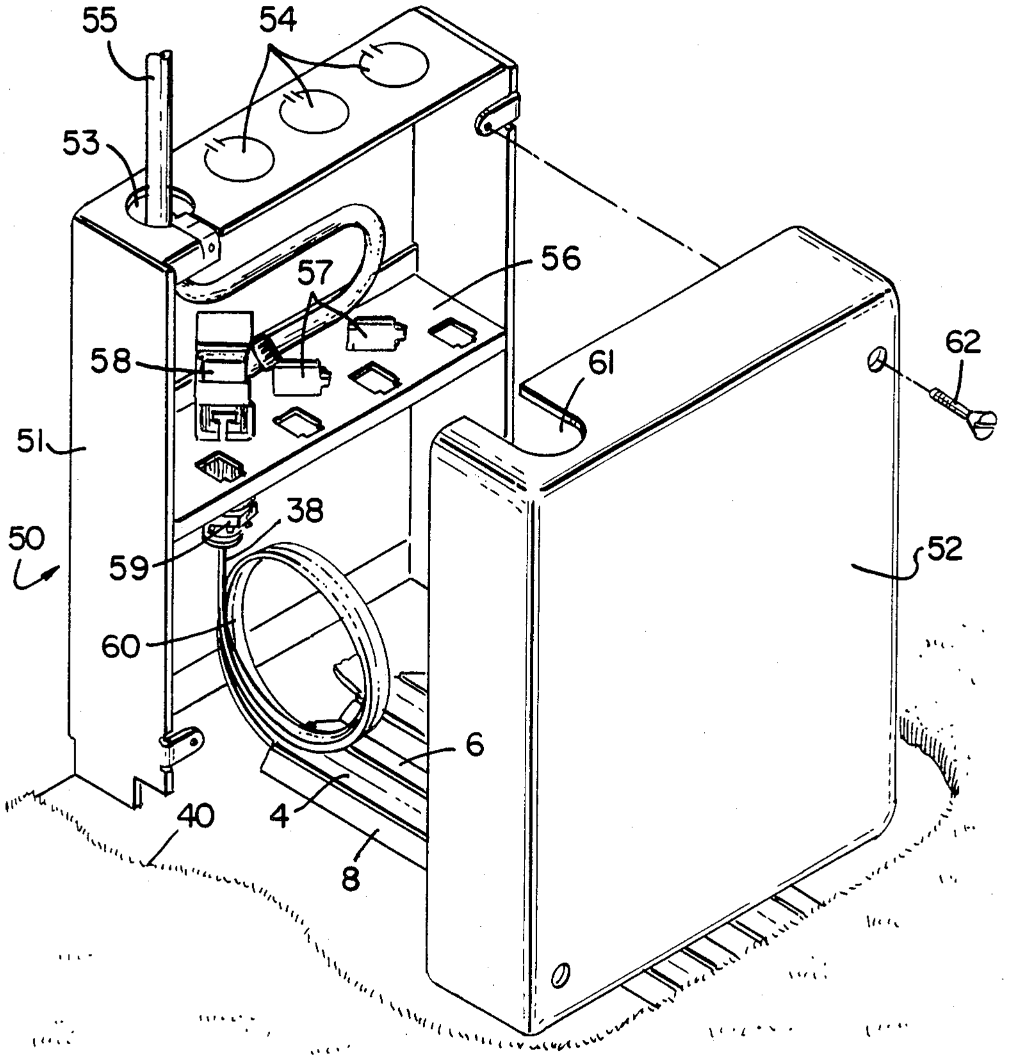
FIG. 10 is a more detailed view of the wall box shown in FIG. 9.
Figure 11:
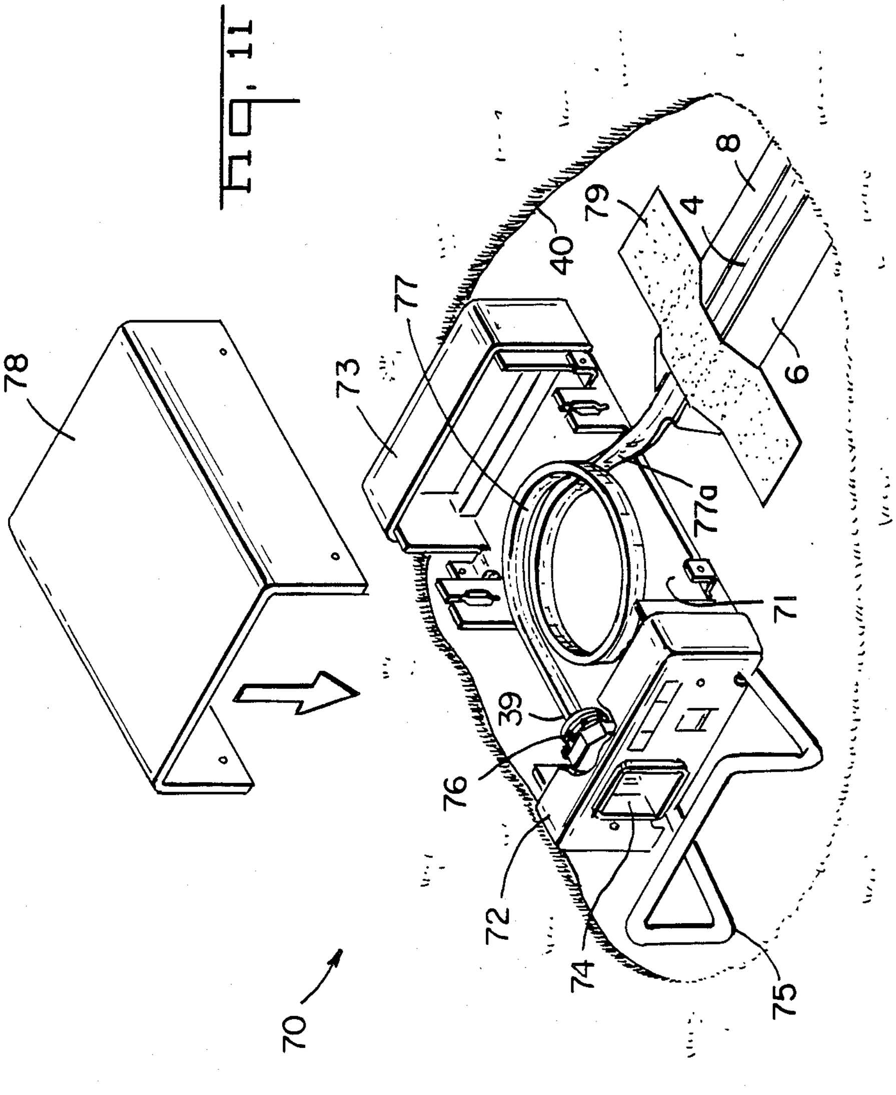
FIG. 11 is a more detailed view of the floor fitting shown in FIG. 9.

A wall box 50 and floor fitting 70 comprising elements of the new distribution system such as that shown in FIG. 9 are illustrated in more detail in FIGS. 10 and 11. Wall box 50 comprises a face 51 formed out of a sheet metal and secured either directly to a wall or recess in a wall. As shown in FIG. 10, the wall box base 51 is mounted to the wall immediately adjacent to the floor. Access to the interior of base 51 is provided by an opening 53 defined along the top surface of the base of adaptor to receive a round cable 55 from another component of the electrical system. In the preferred embodiment of this invention opening 51 is formed by removing one of several frangible cutouts 54 defined along the top surface of the base. Cable 55 is attached to a standard connector 58 by conventional means. An intermediate bulkhead or shelf 56 is defined within base 51 and has a number of cutouts 57 specifically adapted to receive a connector 58. Connector 58 is a connector of the type disclosed in U.S. Pat. No. 4,449,778 and can be inserted through openings 57 in the bulkhead or shelf 56. An adaptor of the type as disclosed in U.S. patent application Ser. No. 716,779, filed Mar. 27, 1985, entitled ADAPTOR FOR COUPLING A CABLE TO A CONNECTOR, filed concurrently herewith and referred to herein is used to attach cable 2 to the connector 58. As shown in FIG. 10, the ramps or wings 6 and 8 are first removed from the central body portion of the connector and a loop 60 is formed adjacent the end of the cable attached to adaptor 59. The connector 58 can then be inserted through openings 57 into position in the wall box 50. As shown in FIG. 10, the openings 57 for receiving the adaptor and connector 58 are obliquely oriented in shelf 56 in order to provide for a larger number of connectors. Once the connector is inserted within shelf 57, an outer cover 52 may be attached to the base 51 by means of suitable fastening means which may include conventional screws 62. Loop 60 will be retained within the enclosure formed by the base 51 and cover 52. Loop 60 is provided so that a subsequent field termination would be possible in the event that the initial termination to connector 60 is improperly applied or malfunctions during the life of the connector.

FIG. 11 is an exploded perspective view of a floor fitting used with cable 2. Floor fitting 70 comprises a base 71 having end portions 72 and 73 rigidly attached thereto. One of the end portions 72 has a connector-receiving opening 74 adapted to receive a connector attached to a component in an electrical system. An adaptor 76 attached to a conventional connector can be attached to the rear of end portion 72 in position to mate with a connector inserted through opening 74. A rigid kick bar 75 is rigidly attached to the housing base 71 to prevent damage to the mating connector and to wires extending therefrom. In the preferred embodiment end portion 72 is rigidly attached to the kick bar 75 which is in turn rigidly attached to the housing base 75. Cable 2 is secured to the floor by a tape 79 positioned adjacent one side of the floor fitting 70. The wings 6 and 8 of the cable have been removed adjacent the end, with a section of the central body including the cable connectors extending therefrom. The central body section 4 is formed into a loop 77 which can be received within floor fitting 70. To form loop 77 the central body portion is first twisted or rotated about its axis such that the plane of the central body section 4 and the conductors therein is perpendicular to the floor. The loop 77 is then formed and the adaptor 76 and connector are positioned in the end wall 72 with the plane of the conductors extending perpendicular to the floor and perpendicular to the cable attached to the floor. With the connector attached in endwall 72 and the loop 77 defined, a cover 78 can be secured to the top of base plate 71.

Electrical transmission cables without the present design with a low profile configuration and having tapered edges, as disclosed herein, present an inconvenience and hazard when used in a normal office environment. If, for example, the cable were of a high profile or did not have the tapered wings, someone could accidentally trip over the obstruction created by such cable and injure himself. This is a major concern. Beyond this, a high profile cable would present an unsightly appearance due to the obvious ridge in the carpet and would create a permanent indentation set into the carpet particularly if the carpet were of a synthetic fabric. Electrical transmission cables without the present low profile design with tapered edges, as disclosed herein, also are subject to the risk of reduced performance of the signals transmitted by the cable as caused by forces acting through the carpet to the cable which affect the shield and wires within the cable.

Although the invention has been described in terms of two embodiments and additional extensions of this invention have been discussed, it will be appreciated that the invention is not limited to the precise embodiments disclosed or discussed since other embodiments will be readily apparent to those skilled in the art.

What is claimed is:

1. An electrical distribution system for installation under a carpet along a floor of a pre-existing building, for transmitting high frequency signals between system components arbitrarily distributed in the building; comprising:

an undercarpet flat cable comprising a plurality of pairs of electrical signal wires located in a common plane and spaced from each other along their lengths, each pair being separately embedded intermediate the ends thereof within an insulating core, each core being surrounded by a shield; multiple shielded insulating cores being embedded within a common insulating body; the body, the shield and the core being progressively removed from the wires adjacent at least one end;

first and second outlet receptacles mounted adjacent the floor and disposed at opposite ends of the cable, the portion of the cable having the body, the shield, and the core progressively removed being within the outlet receptacles; and an electrical connector interconnected at each end of the cable having the body, the shield and the core progressively removed to the signal wires and to each shield being mounted within the outlet receptacles for interconnection to a mating electrical connector.

2. The system of claim 1 wherein the cable body further comprises longitudinally tapered wings on opposite sides of a central portion, the cable wings being removed adjacent the ends with the central portion only disposed within the outlet receptacles.

3. The system of claim 1 further comprising a connector adapter comprising means for connecting each shield to the connector.

4. The system of claim 1 wherein each signal wire is surrounded by an insulating material having a lower dielectric constant than the insulating core, the insulating core extending between the lower dielectric constant insulating material surrounding each signal wire.

5. The system as set forth in claim 1 wherein at least one of the outlet receptacles comprises a wall-mounted box having a bulkhead therein defining at least one connector adapter opening for mounting the connector therein, the cable forming a loop in the wall-mounted box the loop being confined to one side of the bulkhead.

6. The system of claim 5 wherein the connector adapter openings are oriented to receive the connector obliquely relative to wall-mounted box.

7. The system as set forth in claim 1 wherein at least one of the outlet receptacles comprises a floor fitting, the cable body being rotated so that the plane of the cable body forming the loop in the floor fitting is perpendicular to the plane of the cable on the floor.

8. The system of claim 1 wherein the thickness of the body does not exceed about 70 mils to about 80 mils.

9. An electrical distribution system for installation under a carpet along a floor of a pre-existing building, for transmitting high frequency signals between system components arbitrarily distributed in the building; comprising:

a multi conductor flat cable further comprising a plurality of balanced pairs of associated conductors for transmitting high frequency signals, the cable exhibiting high impedance, low cross talk electrical performance, the conductors being spaced side-by-side in the same plane and being separable at either end of the cable for individual termination, each individual conductor being separately surrounded by a first insulating medium, each conductor pair being in turn encapsulated within an insulating core in a predetermined dimensional configuration, the first insulating medium having a dielectric constant lower than the dielectric constant of the insulating core, a conductive shield surrounding the insulating core surrounding each conductor pair forming a continuous EMI shield around each conductor pair, and an insulating body surrounding the plurality of conductive pairs, the conductive shields being encapsulated in the insulating body; the body, the shields and the core being progressively removed from the conductors adjacent at least one end;

first and second outlet receptacles mounted adjacent the floor and disposed at opposite ends of the cable, portions of the cable having the body, the shields, and the core progressively removed being within the outlet receptacles; and an electrical connector interconnected to the conductors and to the shields being mounted within the outlet receptacles for interconnection to a mating electrical connector.

10. An electrical distribution system for installation under a carpet along a floor of a pre-existing building, for transmitting high frequency signals between system components arbitrarily distributed in the building; comprising:

a plurality of conductors spaced side-by-side in the same plane and subdivided into associated conductor pairs;

a form insulation surrounding each conductor and having air dispersed therein to reduce the dielectric constant of the foam insulation, the foam insulation being located in areas of relatively high electric fields;

a plurality of separate extruded insulating cores each extruded insulating core in turn surrounding the foam insulated conductors of each conductor of each associated pair, the extruded insulating core imparting dimensional stability to retain the conductors each of associated pair on the prescribed spacing and having a greater compressive strength than the foam insulation, the foam insulated conductors being separable from the extruded insulating cores for individual termination;

a separate EMI shield surrounding each extruded insulating core and each pair of associated conductors;

an outer extruded insulating body, surrounding each EMI shield, the pairs of associated conductors being embedded in the insulating body, the body, the shield and the core being progressively removed from the foam insulated conductors; and first and second outlet receptacles mounted adjacent the floor and disposed at opposite ends of the cable, portions of the cable having the body, the shield, and the core progressively removed being within the outlet receptacles; and an electrical connector interconnected to the conductors and to the shield being mounted within the outlet receptacles for interconnection to a mating electrical connector.

* * * * *